Dec. 4, 1923.  
L. J. STEPHENSON  
1,475,970  
CONTROL MEANS FOR ELECTRICALLY DRIVEN MECHANISM  
Filed Feb. 20, 1920
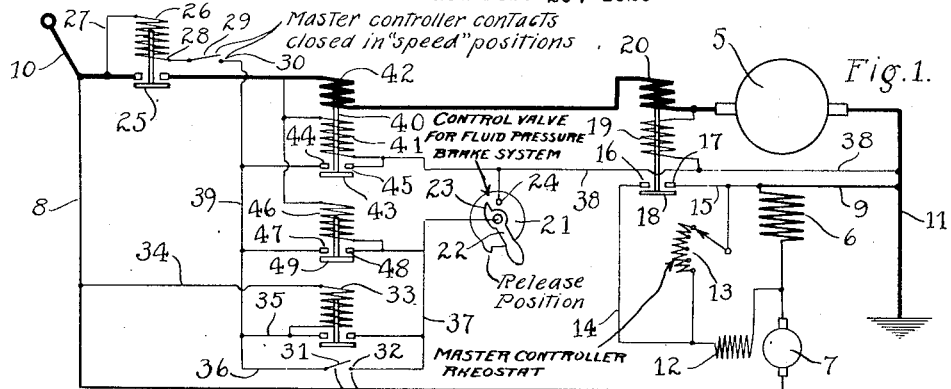
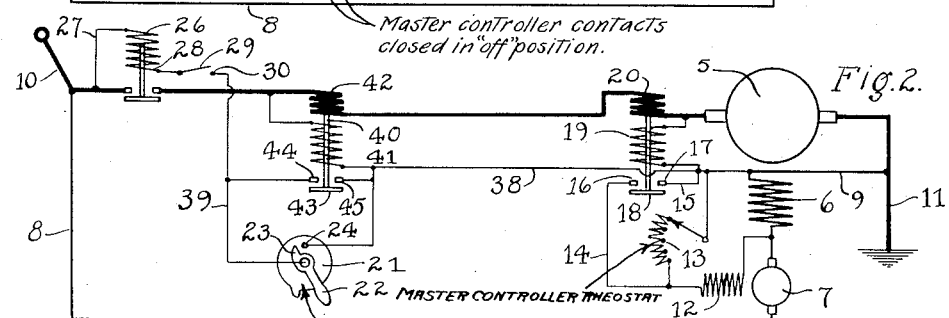
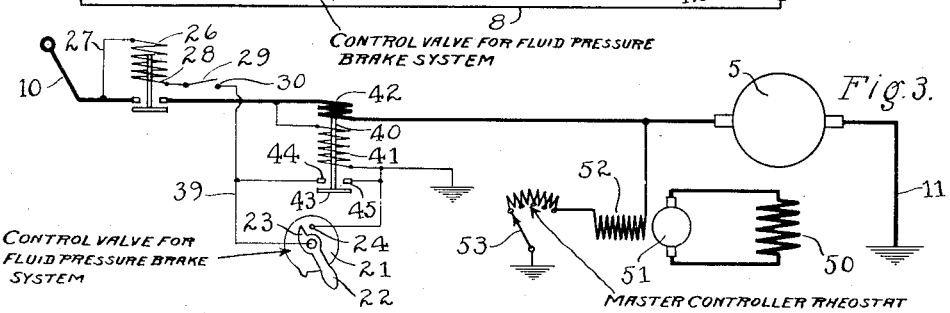
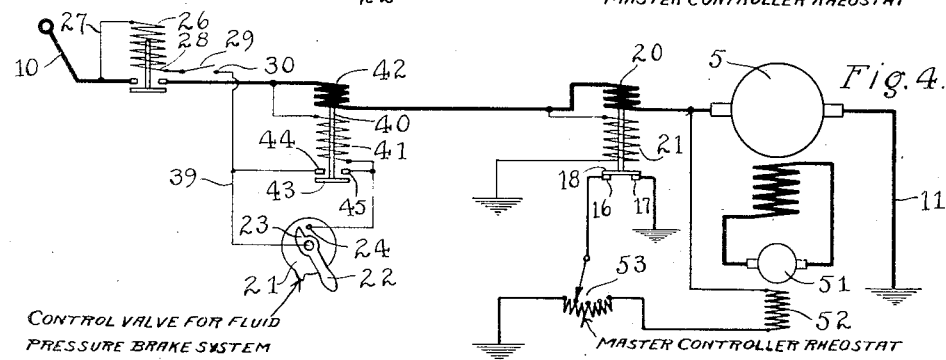
Inventor  
Leigh J. Stephenson  
By Williams, Bradbury  
&c., Attorneys Patented Dec. 4, 1923.

1,475,970

UNITED STATES PATENT OFFICE.

LEIGH J. STEPHENSON, OF CHICAGO, ILLINOIS, ASSIGNOR TO B. V. DECKER, LEIGH J. STEPHENSON, GEORGE B. BURRAGE, WILLIAM T. FENTON, AND LYNN A. WILLIAMS, TRUSTEES, ALL OF CHICAGO, ILLINOIS.

CONTROL MEANS FOR ELECTRICALLY-DRIVEN MECHANISM.

Application filed February 20, 1920. Serial No. 360,131.

*To all whom it may concern:*

Be it known that I, LEIGH J. STEPHENSON, a citizen of the United States, and resident of Chicago, in the county of Cook and State of Illinois, have invented a certain new and useful Improvement in Control Means for Electrically-Driven Mechanism, of which the following is a full, clear, concise, and exact description, reference being had to the accompanying drawings, forming a part of this specification.

My invention relates to improvements in control means for electrically driven mechanism, and is especially concerned with the provision of novel means for controlling the operation of vehicles propelled by electric motors.

The objects of my invention are:

First: To provide a vehicle having mechanical braking equipment and an electric motor capable of functioning either as a motor to drive said vehicle, or as a generator for retarding or stopping said vehicle, with control means, whereby the braking effect of the mechanical brakes or the motor when functioning as a generator can be applied independently of or in conjunction with each other.

Second: To provide control means of the type described, comprising means for automatically limiting the amount of current generated during regeneration, to a predetermined maximum value;

Third: To provide a control system for electric motors adapted to function regeneratively, with means for automatically opening a switch controlling the supply of current to said motor when the regenerated current diminishes to a predetermined value;

Fourth: To provide control means for an electrically driven vehicle, comprising mechanical brakes, in which the means for controlling the mechanical brakes and the means for controlling the electric motor are so interlocked that it is impossible to start the motor or to keep it operating as a motor when the mechanical brakes are applied;

Fifth: To provide a system of control for an electric motor, comprising a switch for controlling the supply of current to the motor, and means which will prevent said switch from being closed after having been opened, and while the vehicle is still in motion, unless the counter-electromotive force being generated by the motor is sufficient to prevent an injurious rush of current through the motor.

Other objects will appear as this description progresses, reference being had to the accompanying drawings, in which—

Figure 1 illustrates my invention in connection with the system of motor control described in my reissue Patent No. 14,787 of January 6, 1920, this figure showing the various electrical connections and portions of the mechanical equipment of a car equipped with my invention;

Figure 2 is a view similar to Figure 1, but showing a modified form of circuit connections;

Figure 3 shows a still further modification of my invention as applied to the control of motor vehicles having a different type of motor from that disclosed in Figures 1 and 2; and Figure 4 shows the circuit arrangements for a further modification of my invention.

In all of the different figures of the drawings I have omitted those portions of the vehicle, the motor, the master controller, and certain other parts of the electrical equipment which are not essential to a clear understanding of my invention.

Referring to the drawings, the reference character 5 indicates the armature of the motor, which is connected with the drive wheels (not shown) of the vehicle, by any suitable or conventional means (not shown). The motor is provided with a field winding 6, which is connected in series with the armature 7 of a small regulating dynamo to form a field winding circuit, of which the conductors 8 and 9 form portions, connected directly across the power lines. In this particular embodiment, this circuit is shown connected between the trolley pole 10 and the conductor 11, which grounds one side of the motor armature 5. Means (not shown) are provided for causing the two armatures 5 and 7 to rotate at speeds constantly proportional to each other. This can be accomplished most simply by mounting the two armatures upon the same shaft. The regulating dynamo is provided with a field winding 12, which is connected in parallel with the field winding 6 of the motor, so that the flow of current through the field winding of the regulating dynamo will be constantly proportional to the flow of current through the field winding 6 of the motor. The ratio between these currents may be varied at will by means of the adjustable rheostat 13. The counter-electromotive force of the regulating dynamo is such as to oppose the potential impressed upon the field winding circuit of the motor, so that the greater the counter-electromotive force of the regulating dynamo the smaller will be the current flowing through the motor field winding, and vice versa.

The apparatus just described is the same as that described in my reissue patent above referred to, and further detailed description thereof and of its operation is unnecessary, except that it might be stated that when the circuit to the motor armature is closed and the rheostat adjusted to exclude all of its resistance, the motor will rapidly accelerate in the same manner that the series motor accelerates until it has reached its top speed or a speed determined by the amount of resistance excluded from the field winding circuit of the regulating dynamo. When it is desired to retard the speed of the vehicle, it is merely necessary to adjust the rheostat to include more resistance in the field winding circuit of the regulating dynamo. This will result in a reduction of the counter-electromotive force of the regulating dynamo, and a corresponding increase in the amount of current flowing through the field winding of the motor. The motor will thereupon generate a voltage higher than line voltage, and will thus cause the return of current to the line, thereby gradually bringing the vehicle to a stop.

The system of control just described may be easily applied to the motors at present in use upon existing electric railway systems, and will effect an economy in the use of electric power. It is quite possible, however, that the motors in use on certain railway systems or portions thereof are so designed that they would not be able to radiate the heat produced by the regenerated current at a rate fast enough to prevent the temperature of the motor from increasing to a degree which would be injurious to the motor if the motor were permitted to regenerate the maximum possible amount of current. It is, however, quite possible that the motor would be able to dissipate more heat than that caused by the motoring currents, or, in other words, that it could dissipate the heat caused by regenerated current providing the amount of regenerated current could be limited so that the heating occasioned thereby would not reach an injurious temperature. One of the objects of my invention is to provide means for limiting the regenerated current to such a value that the heating caused thereby will not injure the motor. I accomplish this result by means of the following apparatus.

The conductors 14 and 15 and the contacts 16, 17 and 18 when closed form a third circuit for the adjustable rheostat 13. The movement of the contact 18 is controlled by a differential relay comprising a shunt coil 19 and a series coil 20, so wound and connected as to oppose each other when the motor 5 is functioning as a motor. In other words, the shunt coil 19 tends to close the contact 18 against contacts 16 and 17, but is opposed by the current flowing through the series coil 20 when the motor is functioning as a motor. Consequently, under the last mentioned condition, the short circuit for the rheostat 13 remains open. During regeneration the direction of the flow of current in the coil 20 will change, so that this coil tends to assist the coil 19 in closing the contact 18. Polarized switches or relays of the type just described can be purchased in the open market, and can be set to close the contact 18 when any predetermined quantity of current is flowing through the coil 20. Consequently, with my improved system of control it is merely necessary to set this polarized relay or switch to operate when the regenerated current reaches a predetermined value, which is permissible without causing injurious heating of the motor. With the apparatus described the movable element of the adjustable rheostat 13 can be moved to include all of the resistance of the rheostat 13 in the field winding circuit of the regulating dynamo when it is desired to bring the car to a stop, and as soon as the regenerated current reaches a predetermined value the contact 18 will be brought into contact with contacts 16 and 17, thereby short-circuiting the adjustable rheostat, increasing the counter-electromotive force of the regulating dynamo, and thereby decreasing the field strength of the motor. This will cause a corresponding decrease in the strength of the regenerated current generated by the motor, which will permit the contact 18 to drop away from contacts 16 and 17, thereby reinserting the resistance in the field winding circuit of the regulating dynamo, decreasing its counter-electromotive force, and strengthening the field of the motor, whereupon it again generates an increased current. This cycle of operation is repeated over and over, with the result that the regenerated current is held at substantially the predetermined value for which the differential relay is adjusted.

It is quite probable that the rate of retardation effected by the limited regenerated current, as described above, will not be sufficient to reduce the speed of the car at as fast a rate as may be desired. I therefore contemplate the use of mechanical brakes, by which term I mean to include hand brakes, air brakes, and any other type of brakes which do not depend upon regeneration for their retarding effect, to supplement the braking effect of the motor when functioning as a generator. In the present case I have illustrated the mechanical brakes as being of the air brake type, and have merely illustrated the control valve 21 and its control lever 22. The remaining portion of the braking system can be constructed in any of the well known ways, and forms no part of my present invention. The control lever of the brake control valve is provided with a contact 23, which, when the control lever is in its release position, is adapted to make contact with the stationary contact 24, and may thereby establish one of several circuits, which will now be referred to in detail.

The line switch 25 is operated by means of a solenoid 26, one terminal 27 of which is connected on the line side of the line switch, and the other terminal 28 of which is closed through the contacts 29 and 30 of the master controller (not shown), whenever the master controller is positioned in any of its "speed" positions. The contacts 31 and 32 are bridged by a relay 33, one terminal of which is connected by the conductor 34 and the conductor 8 with a point on the line side of the switch 25. The other terminal of this solenoid is connected with the conductor 35, so as to form a holding circuit for this relay after it has once been closed.

With the above circuits, the operation of a vehicle equipped with my invention is as follows:

Assuming the car to be at a standstill, with the brake control lever in its release position and with the master controller in its "off" position, the contacts 29 and 30 will be separated, and the contacts 31 and 32 will be closed, as will also contacts 23 and 24. Current will thereupon flow through the conductor 34, solenoid of relay 33, conductors 35 and 36, contacts 31 and 32, conductor 37, contacts 23 and 24, conductor 38, and conductor 11, to ground. The solenoid of the relay 33 having thus been energized, its contacts will close, and will be held closed by reason of its holding circuit, as long as the contacts 23 and 24 remain in closed position. If, then, the master controller is moved into its speed positions, thereby gradually cutting out the starting resistance (not shown) for the motor, the contacts 29 and 30 will be closed, and the circuit through the solenoid 26 of the line switch 25 will be closed through the contacts 29 and 30, conductor 39, conductor 35, contacts of the relay 33, conductor 37, contacts 23 and 24, and conductors 38 and 11, to ground. The line switch will thereupon close and will remain in its closed position as long as the contacts 23 and 24 remain closed. The master controller can then be operated to bring the motor to its top speed or any other desired running speed.

It will of course be understood that in practice the master controller will control the operation of the adjustable rheostat 13, as it is this rheostat which controls the speed of the motor after the starting resistance has been cut out. If the motor is operating at its top speed, all of the resistance of the adjustable rheostat 13 may be cut into the field winding circuit of the regulating dynamo, whereupon regeneration will take place under control of the polarized relay, as described above. If the retarding effect produced by regeneration is not sufficient, the operator may supplement its action by applying the mechanical brakes. In applying these brakes, however, the contacts 23 and 24 will be separated. This would cause the main line switch to open, unless some means are provided to prevent such action. The means which I provide for preventing the opening of the line switch 25 under these circumstances comprises the differential relay, indicated as a whole by the reference character 40, comprising the shunt coil 41 and a series coil 42, these coils being wound to oppose each other when the motor is functioning as a motor, but to assist each other in closing the contacts 43, 44 and 45, whenever the motor is functioning as a generator to hold these contacts closed until the value of the regenerated current decreases to a certain predetermined low value, which will probably be in the neighborhood of zero. It will therefore be seen that the contacts 43, 44 and 45 are closed as soon as regeneration is initiated, and held closed as long as regeneration continues, irrespective of whether the contacts 23 and 24 are open or closed. It will be observed, however, that if the operator attempts to apply the mechanical brakes before initiating regeneration, the circuit through the solenoid 26 of the line switch will be interrupted before the contacts 43, 44 and 45 close, and the line switch will open, thereby making it impossible to employ regeneration for bringing the car to a stop. This is desirable for the reason that it compels the operator to initiate the regenerative action before using the mechanical brakes. This is of course not true where the operator wishes to depend entirely upon the mechanical brakes for retarding the vehicle, as this can be accomplished by the usual manipulation of the brake control lever 22. It does, however, prevent the operator from first applying the mechanical brakes, and then starting the regenerative action. It is better to produce the maximum retarding effect possible by using regeneration and supplementing this retarding effect with the necessary retarding effect produced by the mechanical brakes, than first to apply the mechanical brakes and then attempt to supplement their action by the regenerative action.

Sometimes it is desirable to be able to close the line switch after it has been opened, but before the vehicle has come to a complete stop, without first throwing the master controller to its "off" position, in order to "pick up" the line switch, and then move the controller lever back through its first positions. For this purpose I provide means which will permit the line switch to be closed after once having been opened, without moving the master controller lever to its "off" position, providing the counter-electromotive force of the motor at the instant it is desired to close the line switch is large enough to prevent an excessive rush of current through the motor upon the closing of the line switch. This means comprises a relay having the solenoid 46 and the contacts 47, 48, and 49 bridging the contacts 31 and 32. If the line switch has been opened by reason of the separation of the contacts 23 and 24, or if because during regeneration a regenerated current has diminished to the predetermined low value, and the contacts 23 and 24 are again brought together by bringing the brake control lever into its release position, the contacts 47, 48 and 49 will close again and reestablish a circuit to the solenoid 26 of the line switch, and causing the line switch to close, it being, of course, understood that at this time the master controller is still in a "speed" position. It will be noted that when the contacts 23 and 24 are closed, the solenoid 46 is connected across the armature 5 of the motor, so as to be responsive to the counter-electromotive force of the motor. The solenoid 46 can be so designed as to be closed when the counter-electromotive force of the motor is greater than any predetermined minimum limit.

From the above description it will be apparent that my control apparatus provides means whereby either the mechanical brake or the regenerative action of the motor may be used either independently or in conjunction with each other to retard the speed of the vehicle. It also provides means for limiting the current generated by the motor when functioning as a generator. It also provides means for opening the line switch when the regenerated current reaches zero value, or any other predetermined low value, and means for preventing the motor from functioning as a motor when the mechanical brakes are applied, and in addition thereto it includes means for permitting the line switch to be closed after once having been opened, providing the counter-electromotive force of the motor is at that instant sufficient to prevent an excessive rush of current therethrough.

My system also includes means making it necessary for the operator to begin regeneration before applying the air brakes, in the event he wishes to use both means for retarding motion of the vehicle, and it also prevents the operator from starting the vehicle from rest when the mechanical brakes are applied.

With the connections illustrated in Figure 1 it is necessary for the operator to bring the controller lever to the "off" position before he can start his car after it has been brought to a stop. Consequently there is no danger of the car being brought to a stop by means of the brakes, with the controller in a speed position, which would permit of the car starting again upon the mere release of the brakes. If it is left to the operator to throw his controller to the "off" position when the car is brought to a full stop, with the brakes on, the relays 33 and 46 and the contacts 31 and 32 can be omitted, thereby placing the contacts 23 and 24 in parallel with the contacts 44 and 45, as shown in Figure 2. With this arrangement, when the car is brought to a stop by means of the brakes, if the controller is not moved to "off" position, the car will start again on release of the brakes.

The arrangement shown in Figure 3 is similar to that shown in Figure 2, except that it embodies a separately excited motor for propelling the vehicle, by means of which regeneration is accomplished by connecting the separately excited field winding 50 to a separate regulating dynamo 51, which is driven from a separate source of power (not shown). The regulating dynamo is provided with a field winding 52, controlled by an adjustable rheostat 53. This figure does not disclose the means for accomplishing the various connections between the separately excited field of the motor, the motor armature circuit, and the regulating dynamo, but these means are well known and it is thought unnecessary to illustrate them here, as they would merely obscure the real invention. The apparatus disclosed in Figure 3 does not disclose any means for limiting the regenerated current.

The means disclosed in Figure 4 is similar to that shown in Figure 3, except that it does include means for limiting the regenerated current. With apparatus of the type illustrated in Figures 3 and 4, the regenerated current is diminished by the inclusion of resistance in the circuit of the field winding 52 of the regulating dynamo 51, in place of by the inclusion of resistance, as in Figure 1. Consequently in this figure the contact 18 is separated from the contacts 16 and 17 whenever the regenerated current reaches a predetermined maximum limit, thereby inserting the entire resistance of the adjustable rheostat 53 in series with the field winding 52, and thus decreasing the regenerated current, and makes contact with contacts 16 and 17 when the regenerated current falls below the predetermined maximum value, thereby causing only a portion of the resistance of the rheostat 13 to be included in the circuit with the field winding 52, and correspondingly strengthening the field of the motor and causing it to generate an increased current.

In describing the several different modifications of my invention, I have referred to the air brakes or mechanical brakes as controlling the speed of the vehicle upon which the electric motors are mounted by direct action upon the wheels of this vehicle. My invention is not, however, limited to such a construction, but can be used in connection with trains propelled or drawn by electric locomotives, in which case the retarding effect of the brakes should preferably be accomplished through the retarding effect of the air brakes on each of the cars composing the train, in conjunction with the retarding effect produced by the regenerative action of the motors. It should also be understood that my invention is not limited to use in connection with electrically propelled vehicles, but is capable of being used in connection with other mechanism in which the operation thereof is controlled either by or without the use of mechanical brakes.

While I have described the details of the preferred embodiments of my invention, it is to be clearly understood that my invention is not limited to these details, but is capable of other adaptations and modifications within the scope of the appended claims.

Having thus described my invention, what I claim is:

1. The combination with a vehicle provided with mechanical brakes, of a motor for driving said vehicle, a field winding for said motor, means for controlling the current through said field winding to cause said motor to function either as a motor or as a generator driven by the momentum of said vehicle, comprising an adjustable rheostat, a polarized relay energized by current through said motor, for short-circuiting said rheostat when the motor functioning as a generator generates a current of predetermined value, a solenoid switch for controlling the supply of current to said motor, a brake control lever, a master controller, means for closing the circuit through the solenoid of said switch only when said brake lever is in "release" position, and for opening said switch when the vehicle is brought to a stop with brakes applied, other means whereby said solenoid switch can be closed when the counter-electromotive force of said motor is above a predetermined value and said brake control lever is in "release" position, and still other means for holding said solenoid switch "in" while said motor is functioning as a generator, irrespective of the position of said brake control lever, comprising a polarized relay controlled by the regenerated current.

2. The combination with a vehicle provided with mechanical brakes, of a motor for driving said vehicle, a field winding for said motor, means for controlling the current through said field winding to cause said motor to function either as a motor or as a generator driven by the momentum of said vehicle, comprising an adjustable rheostat, a polarized relay energized by current through said motor, for altering the effective resistance of said rheostat when the motor functioning as a generator generates a current of predetermined value, a solenoid switch for controlling the supply of current to said motor, a brake control lever, a master controller, means for closing the circuit through the solenoid of said switch only when said brake lever is in "release" position, and for opening said switch when the vehicle is brought to a stop with brakes applied, other means whereby said solenoid switch can be closed when the counter-electromotive force of said motor is above a predetermined value, and said brake control lever is in "release" position, and still other means for holding said solenoid switch "in" while said motor is functioning as a generator, irrespective of the position of said brake control lever.

3. The combination with a vehicle provided with mechanical brakes, of a motor for driving said vehicle, a field winding for said motor, means for controlling the current through said field winding to cause said motor to function either as a motor or as a generator driven by the momentum of said vehicle, comprising an adjustable rheostat, a polarized relay energized by current through said motor, for altering the effective resistance of said rheostat when the motor functioning as a generator generates a current of predetermined value, a solenoid switch for controlling the supply of current to said motor, a brake control lever, a master controller, means for closing the circuit through the solenoid of said switch only when said brake lever is in "release" position, other means whereby said solenoid switch can be closed when the counter-electromotive force of said motor is above a predetermined value, and said brake control lever is in "release" position, and still other means for holding said solenoid switch "in" while said motor is functioning as a generator, irrespective of the position of said brake control lever.

4. The combination with a vehicle provided with mechanical brakes, of a motor for driving said vehicle, a field winding for said motor, means for controlling the current through said field winding to cause said motor to function either as a motor or as a generator driven by the momentum of said vehicle, comprising an adjustable rheostat, a polarized relay energized by current through said motor, for altering the effective resistance of said rheostat when the motor functioning as a generator generates a current of predetermined value, a solenoid switch for controlling the supply of current to said motor, a brake control lever, a master controller, means for closing the circuit through the solenoid of said switch only when said brake lever is in "release" position, and other means for holding said solenoid switch "in" while said motor is functioning as a generator, irrespective of the position of said brake control lever.

5. The combination with a vehicle provided with mechanical brakes, of a motor for driving said vehicle, a field winding for said motor, means for controlling the current through said field winding to cause said motor to function either as a motor, or as a generator driven by the momentum of said vehicle, other means for controlling the current through said field winding to limit the regenerated current to a predetermined maximum value, a solenoid switch for controlling the supply of current to said motor, a brake control lever, a master controller, means for closing the circuit through the solenoid of said switch when said master controller is in "speed" positions, only when said brake control lever is in "release" position, and other means for holding said solenoid switch "in" while said motor is functioning as a generator, irrespective of the position of said brake control lever.

6. The combination with a vehicle provided with mechanical brakes, of a motor for driving said vehicle, a field winding for said motor, means for controlling the current through said field winding to cause said motor to function either as a motor or as a generator driven by the momentum of said vehicle, other means for controlling the current through said field winding to limit the regenerated current to a predetermined maximum value, a solenoid switch for controlling the current to said motor, a brake control lever, a master controller, and means for closing the circuit through the solenoid of said switch when said master controller is in "speed" positions only when said brake control lever is in "release" position.

7. The combination with a vehicle provided with mechanical brakes, of a motor for driving said vehicle, a field winding for said motor, means for controlling the current through said field winding to cause said motor to function either as a motor or as a generator driven by the momentum of said vehicle, other means for controlling the current through said field winding to limit the regenerated current to a predetermined maximum value, a solenoid switch for controlling the supply of current to said motor, and means for closing the circuit through the solenoid of said switch.

8. The combination with a vehicle provided with mechanical brakes, of a motor for driving said vehicle, a field winding for said motor, means for controlling the current through said field winding to cause said motor to function either as a motor or as a generator driven by the momentum of said vehicle, means for limiting the regenerated current to a predetermined maximum value, and means for causing said mechanical brakes to operate in conjunction with, or independently of said motor for retarding said vehicle, the means for controlling the regenerative action of said motor being independent of said last named means.

9. The combination with a vehicle provided with mechanical brakes, of a motor for driving said vehicle, a field winding for said motor, means for controlling the current through said field winding to cause said motor to function either as a motor or as a generator driven by the momentum of said vehicle, means for limiting the regenerated current to a predetermined maximum value, and means for causing said mechanical brakes to operate in conjunction with, or independently of, said motor, for retarding said vehicle.

10. The combination with a vehicle provided with mechanical brakes, of an electric motor for driving said vehicle, means for causing said motor to function either as a motor or as a generator driven by the momentum of said vehicle, means for controlling said brakes, the said last two means being free to be operated at any speed independently of, or in conjunction with each other, and means for limiting the regenerated current of said motor to a predetermined maximum value.

11. The combination with a vehicle provided with mechanical brakes, of an electric motor for driving said vehicle, means for causing said motor to function either as a motor or as a generator driven by the momentum of said vehicle, means for controlling said brakes, the said last two means being operable at any speed in conjunction with each other, and means for limiting the regenerated current of said motor to a predetermined maximum value.

12. The combination with a vehicle provided with mechanical brakes, of a motor for driving said vehicle, means for controlling said motor to function either as a motor or as a generator driven by the momentum of said vehicle, a switch for controlling the supply of current to said motor, a master controller for regulating the current through said motor, a brake control lever, means for closing said switch when said master controller is in "speed" positions, only when said brake control lever is in "release" position, and other means for holding said switch in while said motor is functioning as a generator, but causing said switch to open when it ceases to function as a generator.

13. The combination with a vehicle provided with mechanical brakes, of a motor for driving said vehicle, means for controlling said motor to function either as a motor or as a generator driven by the momentum of said vehicle, a switch for controlling the supply of current to said motor, a master controller for regulating the current through said motor, a brake control lever, means for closing said switch, and other means for holding said switch in while said motor is functioning as a generator, but causing said switch to open when it ceases to function as a generator.

14. The combination with a vehicle, of a motor for driving said vehicle, a switch for controlling the supply of current to said motor, means for controlling the speed of said motor, means for retarding said vehicle, means controlled by said last named means for opening said switch when the speed of said vehicle reaches a predetermined value, and means controlled by the counter-electromotive force of said motor whereby said switch can be closed when said retarding means are rendered ineffective.

15. The combination with a vehicle, of a motor for driving said vehicle, a switch for controlling the supply of current to said motor, means for controlling the speed of said motor, means for retarding said vehicle, means for opening said switch when the speed of said vehicle reaches a predetermined value, and means whereby said switch can be closed when said retarding means are rendered ineffective.

16. The combination with a mechanism, of a dynamo electric machine either for driving said mechanism, or adapted to be driven as a generator by the momentum of said mechanism, mechanical means for retarding the motion of said mechanism, a switch for controlling the supply of current to said motor, means for opening said switch when said dynamo electric machine is functioning as a motor and said retarding means are applied, and means for preventing said switch from opening when said retarding means are applied, comprising means for causing said dynamo electric machine to function as a generator.

17. The combination with a mechanism, of a dynamo electric machine, either for driving said mechanism, or adapted to be driven as a generator by the momentum of said mechanism, mechanical means for retarding the motion of said mechanism, a switch for controlling the supply of current to said motor, means for opening said switch when said dynamo electric machine is functioning as a motor and said retarding means are applied, and means for preventing said switch from opening when said retarding means are applied and said dynamo electric machine is functioning as a generator.

In witness whereof, I hereunto subscribe my name this 16th day of February, 1920.

LEIGH J. STEPHENSON.

Witnesses:
  EARL R. PIERCE,
  EDNA V. GUSTAFSON.